United States Patent
Sasaki et al.

(10) Patent No.: US 8,742,728 B2
(45) Date of Patent: Jun. 3, 2014

(54) SYSTEM FOR CONTROLLING CHARGING AND DISCHARGING OF LITHIUM ION BATTERY

(75) Inventors: Hironori Sasaki, Ibaraki (JP); Tsunenori Yamamoto, Hitachi (JP); Takefumi Okumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 13/227,890

(22) Filed: Sep. 8, 2011

(65) Prior Publication Data

US 2012/0081077 A1  Apr. 5, 2012

(30) Foreign Application Priority Data

Sep. 30, 2010 (JP) .................................. 2010-220247

(51) Int. Cl.
*H01M 10/46* (2006.01)

(52) U.S. Cl.
USPC .......................................................... 320/136

(58) Field of Classification Search
USPC .......... 320/107, 112, 134, 136; 324/426, 427, 324/430
See application file for complete search history.

(56) References Cited

U.S. PATENT DOCUMENTS

2010/0085015 A1   4/2010   Hamaguchi et al.

FOREIGN PATENT DOCUMENTS

| EP | 2 362 482 A1 | 8/2011 |
|---|---|---|
| JP | 2000-21455 A | 1/2000 |
| JP | 2006-338944 A | 12/2006 |
| JP | 2006-352970 A | 12/2006 |
| JP | 2009-129644 A | 6/2009 |
| JP | 2011-257314 A | 12/2011 |
| WO | WO 2009/066782 A2 | 5/2009 |

OTHER PUBLICATIONS

Japanese Office Action with English Translation dated Sep. 18, 2012 (five (5) pages).
European Search Report dated Jan. 10, 2012 (five (5) pages).
European Search Report dated Jan. 19, 2012 (five (5) pages).

*Primary Examiner* — Edward Tso
(74) *Attorney, Agent, or Firm* — Crowell & Moring LLP

(57) ABSTRACT

A rechargeable battery system that controls charge/discharge of a lithium ion rechargeable battery, includes: an internal resistance detection unit that detects or estimates an internal resistance value indicating an internal resistance at the lithium ion rechargeable battery; and a discharge control unit that executes control so as to set a discharge suspension period while the lithium ion rechargeable battery is discharged if the internal resistance value detected via the internal resistance detection unit during discharge of the lithium ion rechargeable battery exceeds a first threshold value.

6 Claims, 5 Drawing Sheets

SYSTEM FOR CONTROLLING CHARGING AND DISCHARGING OF LITHIUM ION BATTERY

INCORPORATION BY REFERENCE

The disclosure of the following priority application is herein incorporated by reference: Japanese Patent Application No. 2010-220247 filed Sep. 30, 2010

BACKGROUND OF THE INVENTION

1. Field of the Invention

The present invention relates to a rechargeable battery system achieved by using, for instance, a lithium ion rechargeable battery.

2. Description of Related Art

Today, lithium ion rechargeable batteries are extensively utilized in various applications as drive power sources for vehicles such as hybrid vehicles and electric vehicles and as drive power sources for portable electronic devices such as notebook type computers and digital cameras.

SUMMARY OF THE INVENTION

As a battery system achieved by using lithium ion batteries undergoes repeated charge/discharge cycles, it is known to become degraded, which manifests as a phenomenon whereby the internal resistance in the batteries gradually increases. This degradation phenomena tends to occur more readily in a battery system that undergoes large-current, large-capacity charge/discharge cycles.

It is to be noted that while Japanese Laid Open Patent Publication No. 2009-129644 discloses an invention related to charge/discharge of a lithium ion rechargeable battery, its object is to achieve stable output characteristics (IV characteristics) with minimum output fluctuations, and is thus not intended to address the issue of degradation of lithium ion rechargeable batteries.

The present invention provides a battery system that makes it possible to keep the battery internal resistance within an optimal range by deterring or reducing any increase in the internal resistance.

According to the 1st aspect of the present invention, a rechargeable battery system that controls charge/discharge of a lithium ion rechargeable battery, comprises: an internal resistance detection unit that detects or estimates an internal resistance value indicating an internal resistance at the lithium ion rechargeable battery; and a discharge control unit that executes control so as to set a discharge suspension period while the lithium ion rechargeable battery is discharged if the internal resistance value detected via the internal resistance detection unit during discharge of the lithium ion rechargeable battery exceeds a first threshold value.

According to the 2nd aspect of the present invention, in the rechargeable battery system according to the 1st aspect, it is preferred that the rechargeable battery system further comprises a battery condition detection unit that detects a battery voltage, a charge/discharge current, a charge/discharge time length and a battery surface temperature at the lithium ion rechargeable battery; and the internal resistance detection unit estimates the internal resistance at the lithium ion rechargeable battery based upon a cumulative charge/discharge electricity quantity calculated based upon the battery voltage, the charge/discharge current, the charge/discharge time length and the battery surface temperature.

According to the 3rd aspect of the present invention, in the rechargeable battery system according to the 1st aspect, it is preferred that the internal resistance detection unit detects the internal resistance through measurement of a DC resistance or an AC impedance at the lithium ion rechargeable battery.

According to the 4th aspect of the present invention, in the rechargeable battery system according to the 2nd aspect, it is preferred that the discharge control unit calculates a length of the discharge suspension period based upon the cumulative charge/discharge electricity quantity.

According to the 5th aspect of the present invention, in the rechargeable battery system according to the 2nd aspect, it is preferred that the discharge control unit calculates a length of the discharge suspension period based upon the cumulative charge/discharge electricity quantity and coefficients of lithium diffusion corresponding to a positive electrode material and a negative electrode material used in the lithium ion rechargeable battery.

According to the 6th aspect of the present invention, in the rechargeable battery system according to any one of the 1st through 5th aspects, it is preferred that the discharge control unit executes control so as to resume the discharge if the battery voltage detected via the battery condition detection unit after the discharge suspension period elapses is higher than a second threshold value.

According to the 7th aspect of the present invention, in the rechargeable battery system according to any one of the 1st through 6th aspects, it is preferred that: the lithium ion rechargeable battery is constituted with a plurality of battery packs; the internal resistance detection unit is disposed in correspondence to each of the plurality of battery packs to detect or estimate the internal resistance value indicating the internal resistance at the corresponding battery pack or the internal resistance of a battery cell constituting part of the corresponding battery pack; and the discharge control unit is disposed in correspondence to each of the plurality of battery packs so as to execute control to individually set a discharge suspension period for the corresponding battery pack.

DESCRIPTION OF PREFERRED EMBODIMENT

Figure 1:
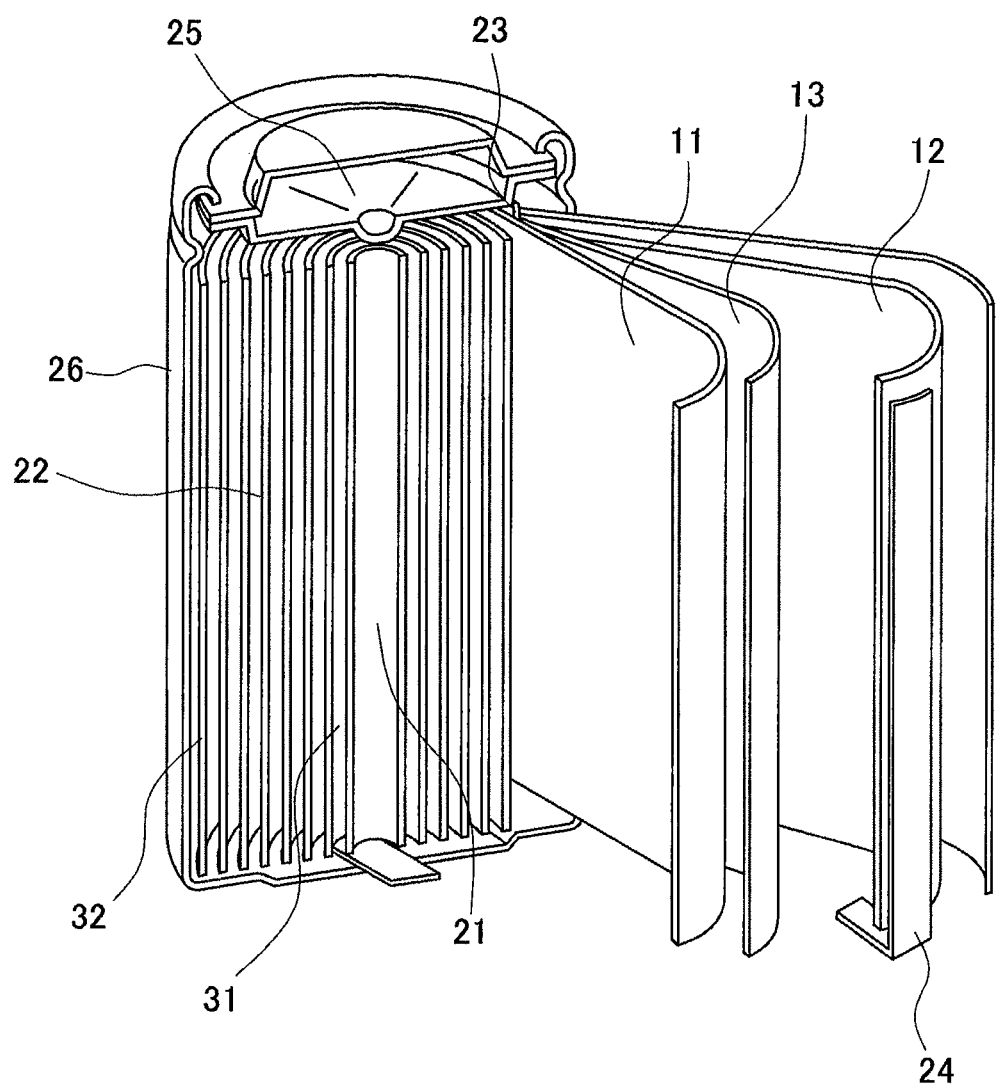
FIG. 1 is a cutaway perspective of a cylindrical non-aqueous rechargeable battery achieved in an embodiment of the present invention.

The inventors of the present invention have discovered that even after the internal resistance in a lithium ion rechargeable battery (secondary battery) increases, the internal resistance in the lithium ion rechargeable battery can be gradually lowered under optimal charge/discharge cycle conditions, e.g., by sustaining a no-load state for approximately 10 days following the internal resistance increase.

In addition, there is a tendency whereby as the internal resistance increases over the course of charge/discharge cycles, the lithium ion concentration in the electrolyte held between the power generation elements, i.e., between the positive electrode and the negative electrode, becomes lower. The internal resistance is assumed to rise as the lithium ion electrolyte constituents in the electrolyte decompose/recompose, inorganic matter constituted of the products resulting from the decomposition of the electrolyte is deposited onto the surfaces of the negative electrode and the positive electrode and the transmission of lithium ions at the electrode surfaces is blocked by the deposits. The inventors of the present invention have found that there is a positive correlation in that, as the ratio of the decomposed electrolyte products present at the surfaces of the positive electrode and the negative electrode increases, the internal resistance, too, increases.

According to the present invention, achieved based upon the findings outlined above, the battery internal resistance can be kept within an optimal range by deterring any increase in the internal resistance and even by decreasing the extent of internal resistance increase through control of charge/discharge parameters in a lithium ion rechargeable battery.

Parameters critical in estimating the internal resistance at a lithium ion rechargeable battery may include the battery voltage, the charge/discharge current, the charge/discharge electricity quantity and the battery temperature. Under normal circumstances, when the battery voltage, which indicates the state of charge in the lithium ion rechargeable battery, is high, the process of self-discharge of lithium ions present on the negative electrode side advances, resulting in a loss of lithium ions and accelerated degradation. In addition, at a high battery temperature, the process whereby the electrolyte within the lithium ion rechargeable battery becomes decomposed and decomposition products are formed is assumed to accelerate, leading to premature degradation. The charge/discharge current and the charge/discharge electricity quantity respectively indicate the speed with which lithium ions enter/depart the electrodes and the quantity of lithium ions entering/departing the electrodes. The process of degradation is considered to be speeded up if either parameter takes a greater value.

It is surmised that the internal resistance of a lithium ion rechargeable battery can be reliably estimated through calculation by handling the variables representing the various parameters as a function through multivariate analysis of the parameters. An expression for internal resistance estimation proposed in the present invention will be described in detail later.

Next, in reference to drawings, an embodiment of the present invention is described.

FIG. 1 shows a non-aqueous rechargeable battery (secondary battery) (hereafter may be simply referred to as a battery) achieved in the embodiment. An electrode winding assembly 22, manufactured by winding a positive plate with an active material thereof constituted of a lithium oxide compound and a negative plate 12 with an active material thereof constituted with a material that holds lithium ions via a separator 13 in a coil, is housed inside a cylindrical battery case 26 having a solid bottom. A negative electrode tab 24, led out from the bottom of the electrode winding assembly 22, is welded to the bottom of the battery case 26 and then, a positive electrode tab 23 led out from the top end of the electrode winding assembly 22 is welded to a battery lid 25. A specific type of electrolyte is charged into the battery case 26 and then the battery lid 25 with an insulating gasket (not shown) attached to the outer edge thereof is set and caulked so as to close off the opening at the battery case 26. In the following description, the side where a winding axis 21 is present will be referred to as an inner circumferential side 31 and the outer side of the winding assembly will be referred to as an outer circumferential side 32.

The positive electrode active material coating the positive plate 11 may be, for instance, lithium cobalt oxide or modified lithium cobalt oxide (e.g., with aluminum or magnesium dissolved in lithium cobalt oxide), lithium nickel oxide or modified lithium nickel oxide (with nickel partially replaced with cobalt), lithium manganese oxide or modified lithium manganese oxide, or a lithium nickel manganese cobalt compound oxide.

The electrically conductive agent used in conjunction with the positive plate may be a single-component material constituted of a carbon black, such as acetylene black, ketjen black, channel black, furnace black, lamp black or thermal black, or any of various types of graphite. As an alternative, multiple-component material constituted with some of these materials may be used as the electrically conductive material used in conjunction with the positive plate.

Polyvinylidene difluoride (PVdF), modified polyvinylidene difluoride, polytetrafluoroethylene, a rubber particulate binder with an acrylate unit or the like may be used as the positive electrode binding agent. Such a binding agent may contain an acrylate monomer with a reactive functional group incorporated therein or an acrylate oligomer may be mixed in the binder.

The negative electrode active material coating the negative plate 12 may be, for instance, any of various natural graphites, artificial graphite, a silicon compound material such as silicide, or any of various plastic metal materials.

While any of various binders including PVdF and modified PVdF may be used as the negative electrode binding agent, it is more desirable, in order to allow lithium ions to enter the negative electrode with better efficiency, to use a binder constituted with styrene-butadiene copolymer rubber particles (SBR) or modified styrene-butadiene copolymer rubber particles in conjunction with a cellulose resin such as carboxymethyl cellulose or to add a small quantity of cellulose resin or the like into the negative electrode binding agent.

The electrically conductive material used in conjunction with the negative plate may be a single-component material constituted of a carbon black, such as acetylene black, ketjen black, channel black, furnace black, lamp black or thermal black, or any of various types of graphite. As an alternative, a multiple-component material constituted with some of these materials may be used.

While there are no special limitations imposed with regard to the material constituting the separator as long as it assumes a composition robust enough to withstand use within the expected range of conditions of operation for lithium ion rechargeable batteries, it is desirable to use a micro-porous film constituted of a single olefinic resin such as polyethylene or polypropylene or a composite olefinic resin containing polyethylene and polypropylene in combination, as in standard practice. In addition, while there are no specific limitations imposed with regard to the thickness of the separator, it is desirable to assume a 10 to 40 μm thickness for the separator.

Electrolytic salts constituted of any of various lithium compounds such as $LiBF_6$ or $LiBF_4$ may be used for the electrolyte. In addition, ethylene carbonate (EC), dimethyl carbonate (DMC), diethyl carbonate (DEC) or ethyl methyl carbonate (MEC) may be used alone or some of them may be used in combination as the solvent. Furthermore, stability in the event of overcharge/discharge may be assured through solid formation of a good film on the positive electrode and the negative electrode achieved by using vinylene carbonate (VC), cyclohexyl benzene (CHB) or modified vinylene carbonate or modified cyclohexyl benzene.

The electrode winding assembly in the embodiment does not need to achieve a true cylindrical shape and it may instead assume the shape of a tubular oval with an elliptical section or it may assume a prismatic shape with a rectangular section. While it is desirable to adopt a mode of use in which the electrode winding assembly is housed within a tubular battery case with a solid bottom, which is filled with the electrolyte, and the battery case is sealed with the tabs through which a current is extracted from the electrode plates, welded to the lid and the battery case, the present invention is not limited to this mode either.

Furthermore, while there are no special limitations imposed with regard to the battery case housing the electrode winding assembly, it is desirable to use a battery case assuring reliable strength, superior anti-corrosive characteristics and machinability, such as a battery case constituted with plated iron, a stainless steel battery case or the like. In addition, the battery case may be manufactured by using an aluminum alloy or any of various types of engineering plastic materials to achieve lighter weight or it may be manufactured by using both an engineering plastic material and a metal material.

Figure 2:
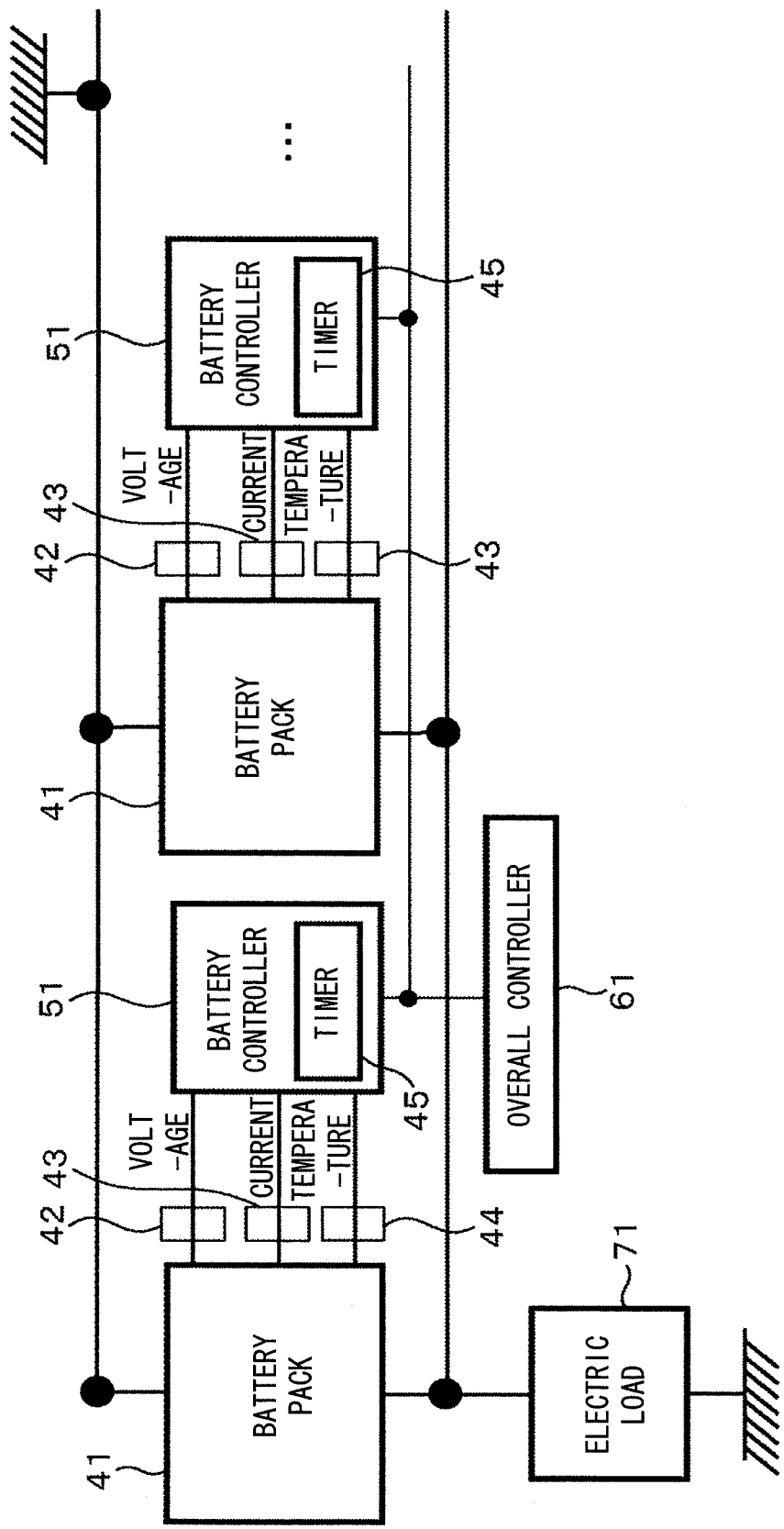
FIG. 2 is a schematic block diagram of the rechargeable battery system achieved in the embodiment of the present invention.

FIG. 2 shows a rechargeable battery (secondary battery) system. A plurality of batteries, each made up with a battery, such as that shown in FIG. 1, are connected in series and in parallel in each battery pack (assembled batteries) 41. The rechargeable battery system includes a battery controller 51 installed so as to detect the conditions of a specific battery pack 41. The battery controller 51 detects the battery voltage, the charge/discharge current and the battery surface temperature at the corresponding battery pack 41 and also measures the cumulative charge/discharge time, the cumulative charge/discharge electricity quantity and the cumulative total time. The battery packs 41 are each constituted with a plurality of lithium batteries (battery cells) electrically connected in series, in parallel or in series/parallel.

A plurality of battery pack, battery controller sets each made up with a battery pack 41 and a corresponding battery controller 51 are installed in parallel and data obtained at the battery controllers 51 are all transmitted to an overall controller 61. A charge/discharge current value and the corresponding length of charge/discharge time for each battery, determined in correspondence to the data obtained from each battery controller, are indicated in data transmitted from the overall controller 61 to the battery controller.

The battery controller 51 includes a microcomputer constituted with a CPU, a ROM and a RAM, which is engaged in operation based upon a specific program. The battery controller 51 executes charge/discharge control for the battery pack 41 based upon the data transmitted from the overall controller 61.

A section achieving part of the control executed by the battery controller 51, which is equivalent to a control function (mechanism) whereby the internal resistance value is detected or estimated will be referred to as an internal resistance detection unit in the description. In addition, in the description of the present invention, which is characterized in the discharge control method adopted therein, a section achieving a control function (mechanism) pertaining to the discharge will be referred to as a discharge control unit.

As does the battery controller, the overall controller 61 includes a microcomputer constituted with a CPU, a ROM and RAM, which is engaged in operation based upon a specific program. The overall controller 61 is connected with each battery controller 51 through a communication cable 52 that enables bidirectional communication, and executes various types of control in correspondence to the conditions of the corresponding battery pack 41.

A voltage detection unit 42 detects the voltage at the battery pack. While the detection target battery voltage may be, for instance, the voltage at one of the batteries constituting the battery pack, the voltage of a group of batteries connected in series or the voltage of the battery pack achieved by connecting a plurality of batteries in series/parallel, there are no special limitations imposed with regard to the measurement target battery voltage.

A current detection unit 43 detects a value indicating the charge/discharge current. While the charge/discharge current value may be detected via a galvanometer, a meter that detects a current by using a shunt resistor or a clamp meter, the present invention is not limited to these options and any means capable of detecting a current value may be used in conjunction with the present invention.

A temperature detection unit 44 detects the temperature of the battery pack 41. While the temperature may be detected by a means such as a thermocouple or a thermistor, no special limitations are imposed. In addition, the temperature detection site may be, for instance, a battery surface, the inside of a battery, the surface of the casing housing the battery pack or the environment surrounding the battery pack.

The voltage detection unit 42, the current detection unit 43 and the temperature detection unit 44 described above are collectively referred to as a battery condition detection unit.

A timer 45, which is installed within the battery controller, counts a length of time pertaining to charge/discharge of the battery pack 41. It may count, for instance, the length of time elapsing after a discharge start.

Assuming that the rechargeable battery system is installed in a vehicle, an electric load 71 may be, for instance, a heater, a dynamo-electric braking system, an electric power steering system or an electric motor.

In the rechargeable battery system achieved in the embodiment by connecting a plurality of battery packs 41 in parallel as described above, a battery controller 51 is installed in correspondence to each battery pack 41. The battery controller 51 detects the conditions of the particular battery pack 41 and executes control in correspondence to the conditions of the battery pack 41 thus detected. As a result, a rechargeable battery system assuring long service life can be provided by deterring any increase in the internal resistance at each lithium ion rechargeable battery.

Next, a specific charge/discharge control method adopted in the battery controllers 51 is described.

Figure 3:
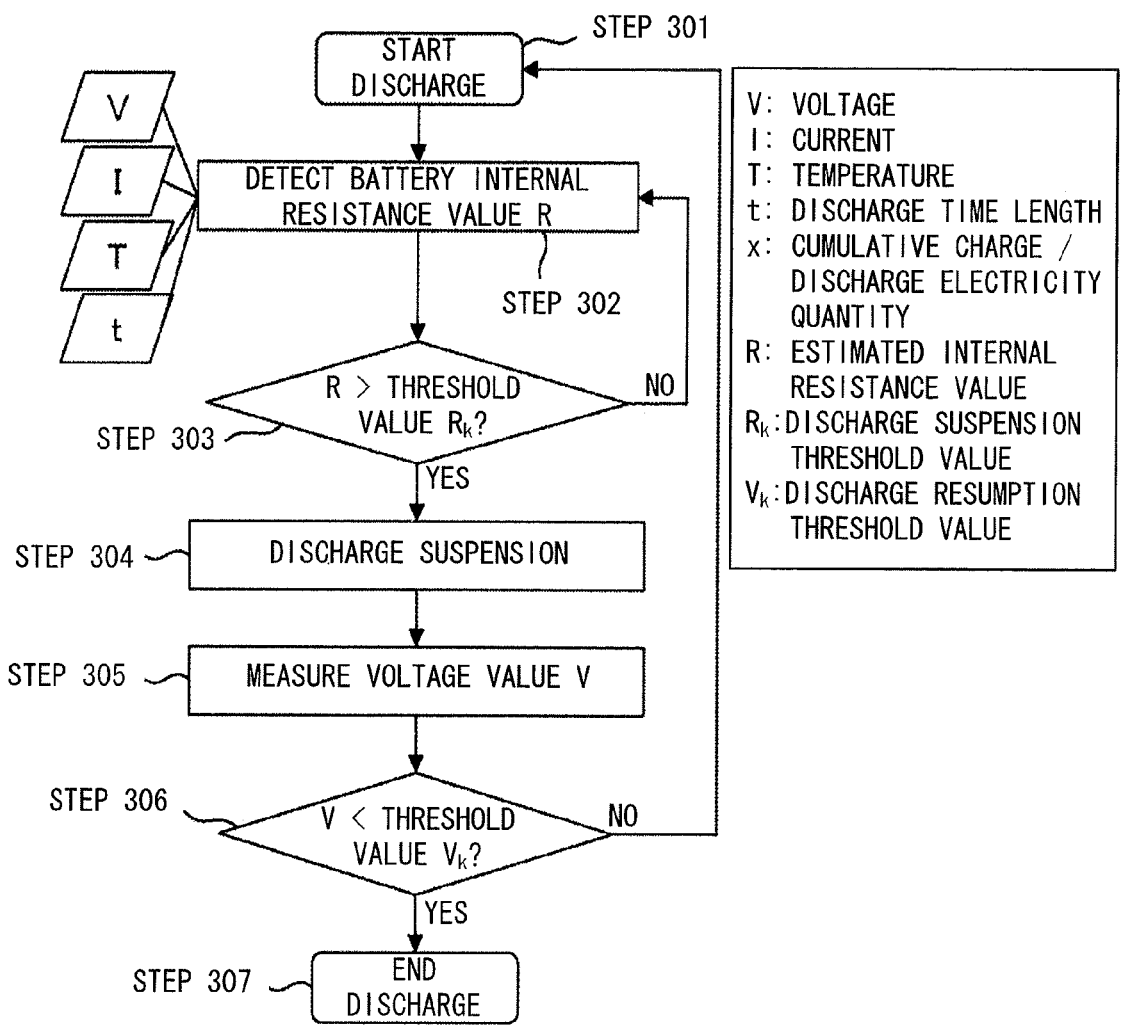
FIG. 3 presents a system flowchart pertaining to the rechargeable battery system achieved in the embodiment of the present invention.

FIG. 3 presents a flowchart pertaining to the rechargeable battery system achieved in the embodiment of the present invention.

First, the overall controller 61 transmits an instruction for the battery controllers 51 so as to start discharging the lithium ion rechargeable batteries and, in response, the battery controllers 51 each start discharging the corresponding battery pack 41 (step 301).

Following the discharge start, each battery controller 51 measures the battery voltage V, the discharge current I and the battery temperature T respectively via the voltage detection unit 42, the current detection unit 43 and the temperature detection unit 44, and also measures the length of discharge time t (the length of time elapsing after the discharge start) via the timer 45.

The battery controller 51 calculates a cumulative charge/discharge electricity quantity x by incorporating these four parameters (V, I, T, t) in the following expression (step 302). It then estimates a value indicating the battery internal resistance based upon the cumulative charge/discharge electricity quantity x thus calculated. In the following description, the battery internal resistance value estimated as explained above will be referred to as an estimated internal resistance value R.

The internal resistance value may be estimated as expressed in (1) below, for example.

$$\Delta R(x) = \alpha_1(x) \cdot V_{ave} + \alpha_2(x) \cdot T + \alpha_3(x) \cdot It + \alpha_4(x) \cdot I \quad (1)$$

$\Delta R(x)$ indicates the extent of increase in the battery internal resistance at a given cumulative charge/discharge electricity quantity, and $\alpha_i(x)$ indicates a coefficient corresponding to a specific variable, which assumes the form of a function of the cumulative charge/discharge electricity quantity. In addition, $V_{ave}$ indicates the average voltage calculated for a specific period (e.g., a single cycle period starting at the discharge start elapsing through the discharge end and the charge start and culminating in the charge end). It indicates a charge/discharge depth (DOD) calculated as; current×time, or a charge/discharge electricity quantity ($\Delta SOC$).

Following step 302, the battery controller 51 compares the estimated internal resistance value R with a discharge suspension threshold value $R_k$ (step 303). If the estimated internal resistance value R is greater than the discharge suspension threshold value $R_k$, the battery controller 51 suspends the discharge and transmits the discharge suspension signal to the overall controller 61 (step 304). However, if the estimated internal resistance value R is less than the discharge suspension threshold value $R_k$, the discharge is continuously executed.

The length of a discharge suspension period $t_{rest}$ may be set to a predetermined value or to a value representing a length of time determined in correspondence to the conditions of the battery pack. For instance, a value calculated based upon the cumulative charge/discharge electricity quantity x, the particle radius r of the particles in the electrode active material used in the battery pack, a coefficient D of lithium diffusion at the positive electrode and the like may be set as the length of the discharge suspension period $t_{rest}$. $\beta(x)$ in the expression below is a coefficient assuming the form of a function of the cumulative charge/discharge electricity quantity. In addition, the value of the lithium diffusion constant D changes in correspondence to the post-discharge battery voltage. In more specific terms, the discharge suspension period should last anywhere from several tens of seconds to several tens of minutes.

$$t_{rest}(x) = \beta(x) \cdot r^2 / 4D \quad (2)$$

During the discharge phase, the battery controller 51 continues to measure the battery voltage V via the voltage detection unit 42 (step 305) and compares the battery voltage V thus measured with a predetermined threshold value $V_k$ (step 306). If the battery voltage V is lower than the predetermined threshold value $V_k$, the operation proceeds to step 307 to end the discharge and accordingly, the battery controller 51 transmits a discharge end signal to the overall controller 61.

If, on the other hand, the battery voltage V is higher than the predetermined threshold value $V_k$, the operation returns to step 302 to resume the discharge.

It is to be noted that although not clearly indicated in the flowchart presented in FIG. 3, the operation proceeds to step 307 to end the discharge if the battery voltage V obtained through the measurement to be used in step S302, is already lower than the predetermined threshold value $V_k$.

In the rechargeable battery system achieved in the embodiment as described above by connecting a plurality of battery packs 41 in parallel, the battery controllers 51 each disposed in conjunction with one of the battery packs 41 detect the conditions of the corresponding battery packs 41. Each battery controller 51 then controls the battery pack so as to suspend the discharge depending upon the conditions of the particular battery pack 41. As a result, a rechargeable battery system assuring an extended service life can be provided by deterring any increase in the internal resistance of each lithium ion rechargeable battery. The plurality of battery packs 41 are each individually controlled by the corresponding battery controller 51 among the plurality of battery controllers. This means that discharge operations in progress at all the battery packs 41 are never simultaneously suspended and the optimal discharge suspension control is executed as necessary for each battery pack 41.

In addition, the internal resistance can be lessened by setting the length of the discharge suspension period in correspondence to the conditions of the battery pack 41, thereby contributing to lengthening the service life of the rechargeable battery system.

It is to be noted that while the internal resistance value is estimated by calculating the cumulative charge/discharge electricity quantity x based upon the four parameters (V, I, T, t) in the flowchart in reference to which the embodiment has been described, the internal resistance may be detected by measuring the DC resistance or the AC impedance at the battery pack 41, instead.

Next, the results of a simulation test conducted to verify the advantages of the present invention will be described.

The lithium ion rechargeable battery used in the test conducted to verify the advantages of the present invention was manufactured by using $LiNi_{0.33}Mn_{0.33}Co_{0.33}O_2$ as the positive electrode active material, carbon black as the position electrode conductive material and polyvinylidene difluoride as the positive electrode binding agent. In addition, nongraphitizable carbon was used as the negative electrode active material, carbon black was used as the negative electrode conductive material and polyvinylidene difluoride was used as the negative electrode binding agent. It is to be noted that the dimensions of a cylindrical battery used in the test were 18 mm in diameter and 65 mm in length (hereafter to be notated as a 18650 battery).

Figure 4:
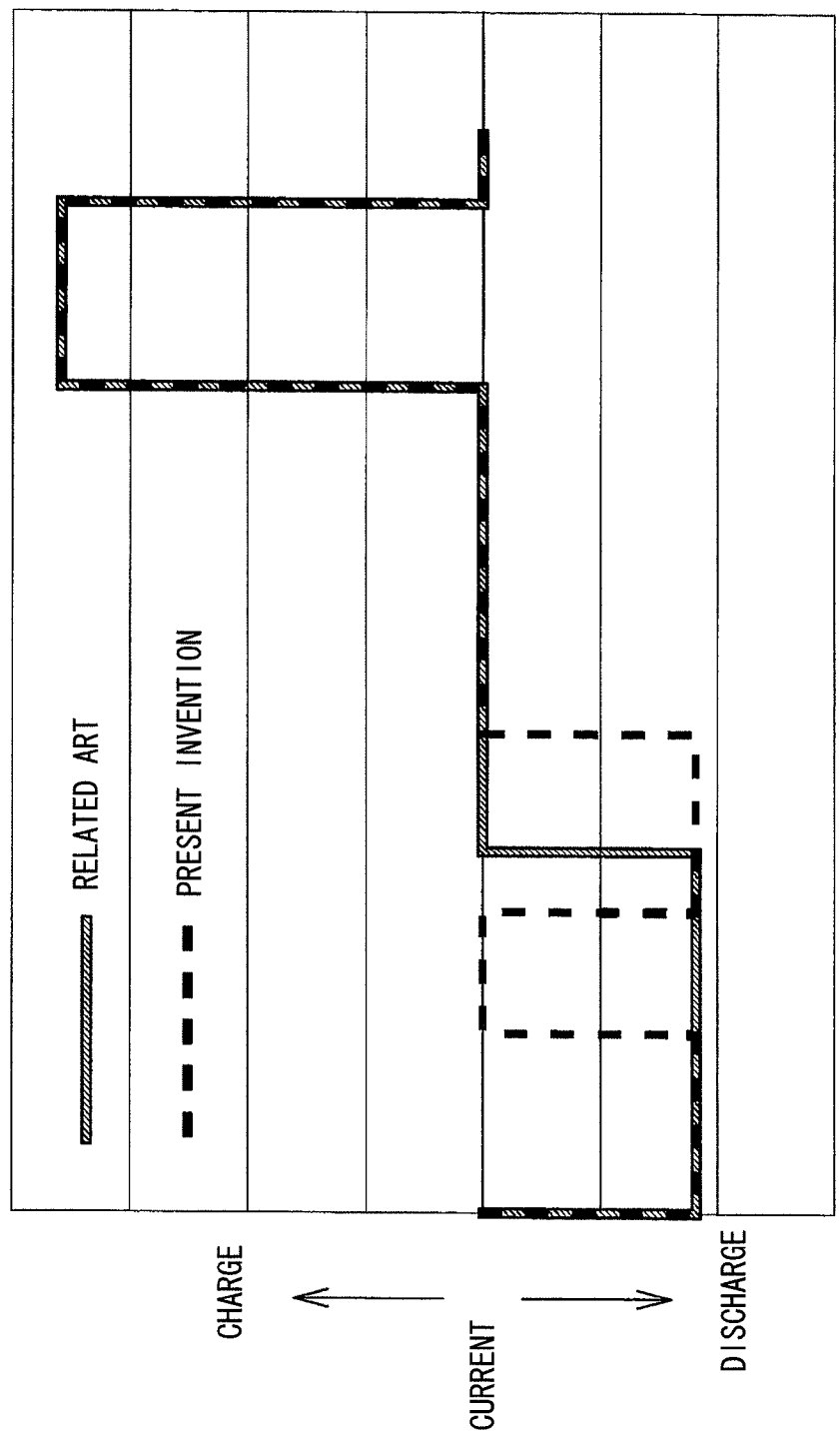
FIG. 4 shows the charge/discharge pattern used in the test conducted for the rechargeable battery system achieved in the embodiment of the present invention.

FIG. 4 shows the charge/discharge pattern with which the test was conducted in order to verify the advantages of the present invention. In the related art, lithium ion rechargeable batteries are charged/discharged with predetermined charge/discharge currents over predetermined lengths of charge/discharge time. The present invention is distinguishable from the related art in that the battery internal resistance is detected or estimated and the discharge phase is controlled accordingly in the rechargeable battery system. In the test, a charge/discharge pattern whereby the discharge phase is divided into two blocks and a discharge suspension period is set between the two blocks, is adopted so as to verify through simulation the advantages of the rechargeable battery system achieved in the embodiment of the present invention.

Namely, in the simulation test, a discharge suspension period was included in each cycle on the assumption that each cycle required a discharge suspension period included therein, instead of setting a discharge suspension period by actually measuring the internal resistance.

Figure 5:
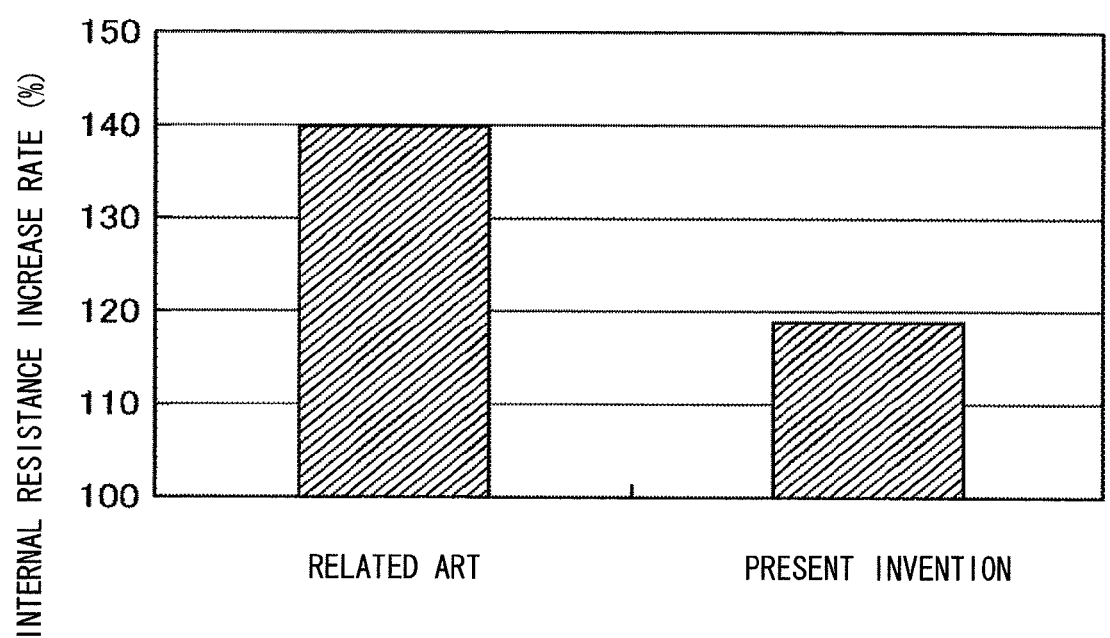
FIG. 5 is a diagram comparing the charge/discharge pattern used in the embodiment of the present invention with a charge/discharge pattern of the related art.

FIG. 5 presents the results of internal resistance measurements taken after rechargeable batteries had undergone 10,000 cycles of charge/discharge with the charge/discharge pattern in the related art shown in FIG. 4 and the charge/discharge pattern simulating the control having been described in reference to the embodiment of the present invention. The rate of increase relative to the initial internal resistance set at 100% is indicated along the vertical axis.

FIG. 5 indicates that the rate of increase in the internal resistance measured in conjunction with the charge/discharge pattern simulating the control according to the present invention is lower than that measured in conjunction with the charge/discharge pattern in the related art by approximately 20 points, substantiating the assertion that any increase in the internal resistance can be deterred in the rechargeable battery system proposed in the embodiment of the present invention.

While the invention has been particularly shown and described with respect to a preferred embodiment thereof by referring to the attached drawings, the present invention is not limited to this example and it will be understood by those skilled in the art that various changes in form and detail may be made therein without departing from the scope and teaching of the invention.

For instance, while the embodiment has been described by assuming that the rechargeable battery system is constituted with core-winding type lithium ion rechargeable batteries, the present invention is not limited to this example and it may be adopted in conjunction with laminated lithium ion rechargeable batteries each made up with a plurality of positive plates and a plurality of negative plates and manufactured by alternately laminating a positive plate and a negative plate via a separator.

What is claimed is:

1. A rechargeable battery system that controls charge/discharge of a lithium ion rechargeable battery, comprising:
    an internal resistance detection unit that detects or estimates an internal resistance value indicating an internal resistance at the lithium ion rechargeable battery;
    a discharge control unit that executes control so as to set a discharge suspension period while the lithium ion rechargeable battery is discharged if the internal resistance value detected via the internal resistance detection unit during discharge of the lithium ion rechargeable battery exceeds a first threshold value; and
    a battery condition detection unit that detects a battery voltage, a charge/discharge current, a charge/discharge time length and a battery surface temperature at the lithium ion rechargeable battery, wherein:
    the internal resistance detection unit estimates the internal resistance at the lithium ion rechargeable battery based upon a cumulative charge/discharge electricity quantity calculated based upon the battery voltage, the charge/discharge current, the charge/discharge time length and the battery surface temperature.

2. A rechargeable battery system according to claim 1 wherein:
    the internal resistance detection unit detects the internal resistance through measurement of a DC resistance or an AC impedance at the lithium ion rechargeable battery.

3. A rechargeable battery system according to claim 1, wherein:
    the discharge control unit calculates a length of the discharge suspension period based upon the cumulative charge/discharge electricity quantity.

4. A rechargeable battery system according to claim 1 wherein:
    the discharge control unit calculates a length of the discharge suspension period based upon the cumulative charge/discharge electricity quantity and coefficients of lithium diffusion corresponding to a positive electrode material and a negative electrode material used in the lithium ion rechargeable battery.

5. A rechargeable battery system that controls charge/discharge of a lithium ion rechargeable battery, comprising:
    an internal resistance detection unit that detects or estimates an internal resistance value indicating an internal resistance at the lithium ion rechargeable battery;
    a discharge control unit that executes control so as to set a discharge suspension period while the lithium ion rechargeable battery is discharged if the internal resistance value detected via the internal resistance detection unit during discharge of the lithium ion rechargeable battery exceeds a first threshold value; and
    the discharge control unit executes control so as to resume the discharge if the battery voltage detected via the battery condition detection unit after the discharge suspension period elapses is higher than a second threshold value.

6. A rechargeable battery system that controls charge/discharge of a lithium ion rechargeable battery, comprising:
    an internal resistance detection unit that detects or estimates an internal resistance value indicating an internal resistance at the lithium ion rechargeable battery;
    a discharge control unit that executes control so as to set a discharge suspension period while the lithium ion rechargeable battery is discharged if the internal resistance value detected via the internal resistance detection unit during discharge of the lithium ion rechargeable battery exceeds a first threshold value;
    the lithium ion rechargeable battery is constituted with a plurality of battery packs;
    the internal resistance detection unit is disposed in correspondence to each of the plurality of battery packs to detect or estimate the internal resistance value indicating the internal resistance at the corresponding battery pack or the internal resistance of a battery cell constituting part of the corresponding battery pack; and
    the discharge control unit is disposed in correspondence to each of the plurality of battery packs so as to execute control to individually set a discharge suspension period for the corresponding battery pack.

* * * * *